United States Patent [19]

Arnoux et al.

[11] Patent Number: 4,611,174
[45] Date of Patent: Sep. 9, 1986

[54] DEVICE FOR GENERATING AN AC RAMP FOR CHECKING THE TRIPPING CURRENT OF A CIRCUIT-BREAKER

[75] Inventors: Daniel Arnoux, St Germain en Laye; Claude Genter, Paris; Jean Bousquet, Domont, all of France

[73] Assignee: Societe en Commandite par actions dite: Chauvin Arnoux, Paris, France

[21] Appl. No.: 574,896

[22] Filed: Jan. 30, 1984

[30] Foreign Application Priority Data

Feb. 1, 1983 [FR] France ................. 83 01523

[51] Int. Cl.[4] .......................................... G01R 31/32
[52] U.S. Cl. ..................................... 324/424; 361/86
[58] Field of Search ............... 324/415, 418, 424, 102; 307/228; 361/86

[56] References Cited

U.S. PATENT DOCUMENTS 3,745,373  7/1973  Jones et al. ..................... 307/228

FOREIGN PATENT DOCUMENTS 2377089  1/1977  France .
2379905  2/1977  France .

Primary Examiner—Stewart J. Levy
Assistant Examiner—Kevin D. O'Shea
Attorney, Agent, or Firm—Gottlieb, Rackman & Reisman

[57] ABSTRACT

A device is provided for generating an AC current ramp for checking the tripping current of the circuit-breaker, in which the current is regulated by a power transistor driven by the voltage available at the middle point of a potentiometric divider, this latter comprising a field effect transistor which is itself driven by a voltage depending on the voltage at the terminals of a capacitor charged by an auxiliary battery. It further comprises a constant current generator which is fed with current by the auxiliary battery for charging said capacitor and a comparator amplifier a first input of which is connected to said capacitor, a second input of which is connected to the junction point between a measuring resistor and said power transistor and the output of which is connected to the gate of said field effect transistor.

9 Claims, 1 Drawing Figure

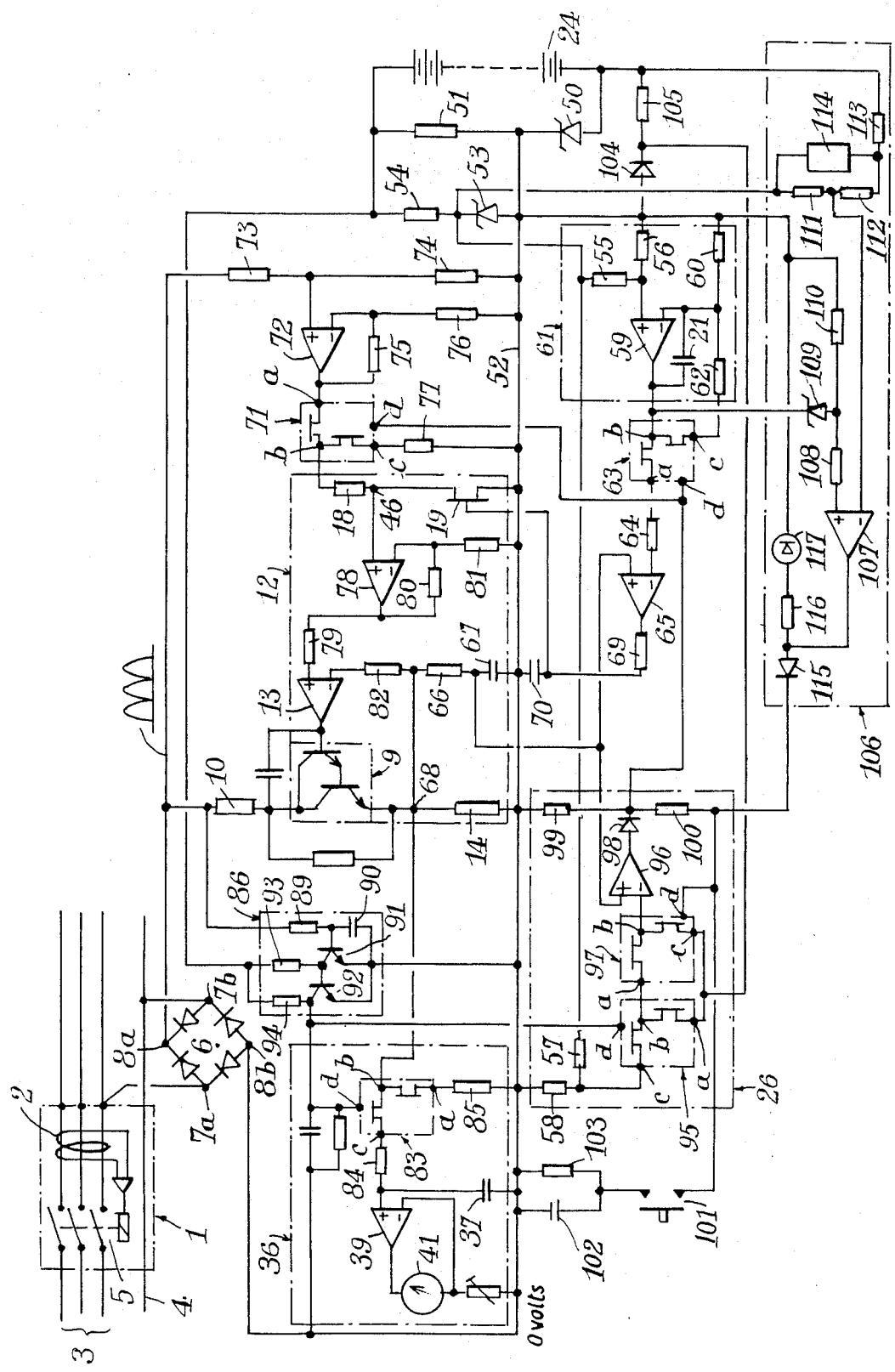

DEVICE FOR GENERATING AN AC RAMP FOR CHECKING THE TRIPPING CURRENT OF A CIRCUIT-BREAKER

BACKGROUND OF THE INVENTION

1. Field of the Invention

The present invention relates to a device for generating an AC ramp for checking the tripping current of a circuit-breaker, comprising a bridge rectifier whose terminals on the AC side are connected respectively to an active terminal of the AC voltage network, situated downstream of the circuit-breaker, and to the system ground or ground or another active terminal of the network situated upstream of the circuit-breaker, a load circuit connected between the two terminals of the bridge rectifier on the DC side, this load circuit being formed principally by a power transistor in series with a measuring resistor, the control terminal of this power transistor being connected to the output terminal of a high gain amplifier, whose first input receives at least a part of the voltage appearing at the terminals of the measuring resistor, a field effect transistor drive by a voltage depending on the voltage at the terminals of a capacitor charged from an auxiliary battery, the conducting resistance of this field effect transistor forming, with a resistor, a potentiometric divider whose middle point is connected to a second input of the high gain amplifier, the potentiometric divider being connected between the two terminals on the DC side of the bridge rectifier.

2. Description of the Prior Art

AC current ramp generating devices are well known (see for example French Pat. No. 2 377 089). They are used for checking the tripping current of a circuit-breaker more especially a residual differential current circuit-breaker, whose protection device is responsive to a current difference, thus allowing a fault current to the system ground or to ground to be detected. In circuit-breakers of this kind, the device for protecting the circuit-breaker must cause the circuit-breaker to trip, i.e. breaking of the current, for a current less than or equal to a current $I_{\Delta n}$, called nominal operating current, and higher than a nominal non operating current, whose value is generally equal to half the value of the nominal operating current. The value of the nominal operating current and the value of the nominal non operating current are defined by standards and, in service, it is necessary to check from time to time the value of the current for tripping the circuit-breaker so as to make sure that it remains between the above mentioned values. This check may be carried out by means of an AC current ramp generating device which produces an increasing AC current following a ramp from a minimum predetermined value, which is less than the nominal non operating current, to another predetermined value which is greater than the nominal operating current.

For the measures carried out at each check to be significant, it is desirable for the AC current ramp generated by the generating device to be as linear and as stable in time as possible. Now, in the known AC current ramp generating device (French Pat. No. 2 377 089), the definition and linearity of the AC current ramp are dependent:

(a) on the value and on the stability of the AC voltage of the network supplying the above mentioned potentiometric divider;

(b) on the pseudo-linearity of growth in time of the conduction resistance of the field effect transistor from the exponential development of the voltage at the terminals of the capacitor which is charged from the auxiliary battery;

(c) on the value of the voltage of the auxiliary battery, which is directly involved in the rate of increase of the voltage at the terminals of said capacitor.

SUMMARY OF THE INVENTION

The present invention provides then an improved generating device capable of generating an effectively linear variation of the AC current from a predetermined value less than the nominal non operating current to another predetermined value higher than the nominal operating current, these values being independent of the value of the AC voltage of the network and the rate of increase of the AC current between the two limits being independent of the voltage of the auxiliary supply battery in the range where said battery is usable.

Subsidiarily, the present invention also provides an improved generating device comprising means for warning the user when the upper deviation limit of the AC current has not been able to be reached because of the presence of an excessive source impedance, particularly in the case of AC voltage networks with impeding neutral.

Subsidiarily, the present invention also provides an improved generating device comprising means for avoiding excessive heating of the power transistor.

In accordance with the present invention, the first above mentioned aim is attained because the AC current ramp generating device further comprises a constant current generator which is supplied with current by the auxiliary battery for charging said capacitor, a comparator a first input of which is connected to the capacitor and a second input of which is connected through a filter to the junction point between the measuring resistor and the power transistor and the output of which is connected to the gate of said field effect transistor.

In one embodiment of the present invention, the constant current generator and the capacitor form a Miller integrator. The auxiliary battery may be a mercury oxide battery. If an ordinary battery is used as the auxiliary battery, a Zener diode is connected to the terminals of the auxiliary battery and the voltage at the terminals at the Zener diode, divided by a voltage divider, is applied to the Miller integrator as input voltage.

BRIEF DESCRIPTION OF THE DRAWINGS

Other features and advantages of the present invention will appear during the following description of a preferred embodiment of the AC current ramp generator of the present invention, given by way of example with reference to the single accompanying FIGURE which shows the circuit diagram of said generating device.

In the drawing, the elements which are identical or which play the same role as those shown in FIG. 1 of French Pat. No. 2377089 are designated by the same reference numbers. To the extent that some of these elements are not directly affected by the present invention, they will not be described in detail again, since, in so far as they are concerned, it is sufficient to refer to the above mentioned French patent.

DESCRIPTION OF THE PREFERRED EMBODIMENT

In the drawing can be seen, as in FIG. 1 of the above mentioned patent, the rectifier bridge 6 whose terminals 7a and 7b, on the AC side, are connected respectively to an active terminal of the power supply network 3, downstream of the circuit-breaker 1, and to ground or to the neutral wire 4 (alternatively, terminal 7b could be connected to another active terminal of network 3 upstream of the circuit-breaker 1). When the breaking member 5 of the circuit breaker 1 is closed, the rectifier bridge 6 delivers at its terminals 8a and 8b uni-directional half waves. In the following description, the potential of terminal 8b is used as reference terminal with a conventional value equal to zero. Thus, the half waves delivered at terminal 8a are of positive polarity.

The main current flows from terminal 8a to terminal 8b by passing successively through the current limiting resistor 10, the power transistor 9, formed by a Darlington circuit, and the measuring resistor 14 of circuit block 12.

The AC current ramp generating device of the present invention differs principally from the one described in Pat. No. 2377089 in that the capacitor 21, which was previously charged by the auxiliary battery 24 through a resistor, is now charged by battery 24 through a constant current generator and in that the voltage at the terminals of capacitor 21, which was previously used for directly driving the field effect transistor 19 of circuit block 12, is now compared with a DC voltage obtained by filtering the voltage available at the terminals of the measuring resistor 14, the voltage resulting from this comparison being applied as driving voltage to the gate of the field effect transistor 19, as will be described in detail further on.

Furthermore, so as to overcome the variations in time of the DC voltage supplied by the auxiliary battery 24, a first Zener diode 50 and a resistor 51 are connected in series to the terminals of battery 24, the anode of the Zener diode 50 being connected to the negative pole of the battery, whereas its cathode is connected to line 52 of zero reference potential, which is itself connected to the terminal 8b of the rectifier bridge 6. A second Zener diode 53 is connected in series with a resistor 54 to the terminals of resistor 51. Two voltage dividers formed respectively by resistors 55 and 56 and by resistors 57 and 58 are connected in parallel to the terminals of the Zener diode 53 for dividing the stabilized DC voltage available at the terminals thereof.

The junction point between the resistors 55 and 56 is connected to the positive input of an operational amplifier 59. Capacitor 21 is connected between the output and the negative input of the amplifier 59. The negative input of amplifier 59 is also connected through a resistor 60 to line 52, so to the anode of Zener diode 53. Elements 21, 55, 56, 59 and 60 form a Miller integrator 61, which supplies a DC voltage at the output of amplifier 59. This DC voltage increases linearly from an initial value which corresponds to the discharged condition of capacitor 21 and which is defined by the voltage divider, formed by resistors 55 and 56, from the positive DC voltage taken at the terminals of the Zener diode 53, this positive voltage being practically independent of that of battery 24. This latter voltage also defines the rate of charge of capacitor 21. As will be seen further on, capacitor 21 may be discharged through a resistor 62 and through the junction bc of an analog switch 63 when this junction is enabled.

The output of amplifier 59 is connected through junction a b of the analog switch 63 and through a resistor 64 to the negative input of a comparator amplifier 65, whose positive input is connected, through a filter formed by resistor 66 and by capacitor 67, to the junction point 68 between the measuring resistor 14 and the power transistor 9. The output of the comparator amplifier 65 is connected, through a filter formed by resistor 69 and capacitor 70, to the gate of the field effect transistor 19.

As in French Pat. No. 2377089, the field effect transistor 19 forms with resistor 18 a potentiometric divider at the middle point 46 of which appears a rectified AC voltage whose amplitude increases linearly and which is used for driving the power transistor 9. However, in the generating device of the present invention, resistor 18 is not connected directly to terminal 8a of the rectifier bridge 6, but is connected through the junction a b of an analog switch 71, to the output of an amplifier 72 with high input impedance. A voltage divider, formed by resistors 73 and 74 is connected between terminal 8a of the rectifier bridge 6 and line 52, which is itself connected to the terminal 8b of the rectifier bridge 6. The junction point between resistors 73 and 74 is connected to the high impedance input (positive input) of the amplifier 72, whereas the negative input of this amplifier is connected to the one hand to its output through a resistor 75 and, on the other, to line 52 through a resistor 76. Terminal c of the analog switch 71 is connected through a resistor 77 to line 52.

Furthermore, instead of being connected directly to the positive input of the high gain amplifier 13 of circuit block 12, the middle point 46 of the potentiometric divider formed by resistor 18 and by the conduction resistance of the field effect transistor 19 is connected to the positive input of an impedance matching amplifier 78 whose output is connected through a resistor 79 to the positive input of the high gain amplifier 13. The negative input of the impedance matching amplifier 78 is connected on the one hand to its output through a resistor 80 and, on the other hand, to line 52 through a resistor 81. The negative input of the high gain amplifier 13 is connected through resistor 82 to the junction point 68 between the measuring resistor 14 and the power transistor 9. The junction point 68 is connected through the junction bc of an analog switch 83 and through a resistor 84 to the storage capacitor 37. The terminal a of the analog switch 83 is connected to line 52 through a resistor 85.

The generating device of the present invention further comprises a circuit 86 whose purpose is to detect the presence of a rectified AC voltage at a terminal 8a of the rectifier bridge 6 and to permit a measuring cycle. Circuit 86 comprises a filter formed by resistor 89 and capacitor 90 which are connected in series between terminal 8a and line 52. The junction point between resistor 89 and capacitor 90 is connected to the base of a first npn transistor 91 whose collector is connected to the base of a second npn transistor 92. The emitters of the two transistors 91 and 92 are connected to line 52, whereas their collectors are connected respectively by resistors 93 and 94 to the positive pole of battery 24. The collector of transistor 92 is further connected to the control terminal d of the analog switch 83 and to the control terminal d of another analog switch 95 inserted in circuit 26 which controls the return to the minimum value of the AC current ramp generated by the generating device of the present invention.

Circuit 26 comprises an amplifier 96 whose negative input is connected to the junction point between resistors 57 and 58 through the junction bc of the analog switch 95 and through the junction ab of another analog switch 97. The positive input of amplifier 96 is connected to the junction point between resistor 66 and capacitor 67. The output of amplifier 96 is connected to the anode of a diode 98 whose cathode is connected to line 52 through a resistor 99, to the control terminal d of the analog switch 97 through a resistor 100 and directly to the control terminals d of the analog switches 63 and 71. The control terminal d of the analog switch 97 is also connected to one of the contacts of a push button switch 101 whose other contact is connected to line 52 through a capacitor 102 which is maintained in the discharged condition by a resistor 103. A diode 104 and a resistor 105 in series with diode 104 are connected in parallel across the Zener diode 50. The junction point between the cathode of diode 104 and resistor 105 is connected directly to the terminal a of the analog switch 95 and to the terminal c of the analog switch 97 so as to apply to these two terminals the negative voltage (about 0.6 V) which is available at the cathode of diode 104.

The generating device of the present invention further comprises a fault indicating circuit 106. This circuit 106 comprises a comparator amplifier 107 whose positive input is connected to the output of amplifier 59 through a resistor 108 and through a Zener diode 109 which causes a constant shift, by a negative value, of the voltage available at the output of amplifier 59 and applied to the positive input of amplifier 107. The junction point between resistor 108 and the anode of the Zener diode 109 is connected through a resistor 110 to line 52. The negative input of the comparator amplifier 107 is connected to the junction point between two resistors 111 and 112 forming a voltage divider one of whose ends is connected to the cathode of the Zener diode 53 and whose other end is connected through a resistor 113 to the negative pole of battery 24, so also to the anode of the Zener diode 50. A temperature responsive device 114, connected electrically to the terminals of the voltage divider formed by resistors 111 and 112, is placed on the heat sink of the power transistor 9. This temperature responsive device 114 may for example be formed by a component LM 335 Z manufactured by the National Semiconductor Company. The output of the comparator amplifier 107 is connected on the one hand to the control terminal d of the analog switch 97 through a diode 115 and on the other hand to line 52 through a resistor 116 and through a light emitting diode 117.

The operation of the generating device of the present invention will now be described. As mentioned above, the main current flows between terminals 8a and 8b of the rectifier bridge 6 while passing through the resistor 10, the power amplifier 9 and the measuring resistor 14. The currents taken off through resistors 73 and 89, whose respective values are of several megohms, may be considered as negligible. Thus, the voltage at the terminals of resistor 14, i.e. at point 68, may be used for defining and measuring the main current.

The rectified AC voltage which is available at terminal 8a of the rectifier bridge 6 is filtered by resistor 89 and capacitor 90. The filtered voltage, which is applied to the base of transistor 91, causes saturation of the latter and, consequently, transistor 92 is disabled. The result is that the voltage at the collector of transistor 92 takes on a positive value equal to that of the positive pole of battery 24. This positive voltage is applied to control terminals d of analog switches 83 and 95, which results in enabling the junctions bc of these two analog switches and disabling their junctions ab.

To initialize a measuring cycle, the contacts of switch 101 should be closed by pressing the push button. Thus, the voltage which is applied to the control terminal d of analog switch 97 and which was initially positive (because of the negative voltage of −0.6 V available at the terminals of diode 104 and applied through the junction bc of the analog switch 97 to the negative input of amplifier 96) becomes momentarily zero because of the capacitive zeroing effect of capacitor 102. This results in enabling the junction ab of the analog switch 97 and disabling its junction bc. Consequently, the positive voltage defined by the voltage divider 57-58 is applied through the junction bc of the analog switch 95 and the junction ab of analog switch 97 to the negative input of amplifier 96 which thus produces at its output a negative voltage which is blocked by diode 98. The voltage applied to the control terminals d of the three analog switches 63, 71 and 97 becomes or remains therefore zero, so that their junctions ab are made or remain conducting.

Capacitor 21 which has been initially discharged through resistor 62 and the junction bc of the analog switch 63 is progressively charged through resistor 60 because junction bc of the analog switch 63 is now disabled. Thus at the output of the amplifier 59 of the Miller integrator 61 a DC voltage is obtained which increases linearly from an initial value corresponding to the discharged condition of capacitor 21 and which is defined by the voltage divider 55-56 from the stabilized DC voltage taken at the terminals of the Zener diode 53. Since the stabilized DC voltage is practically independent of that of battery 24, the initial value of the DC voltage ramp generated by the Miller integrator 61 is therefore perfectly defined and stable.

The rectified AC voltage which is available at terminal 8a of the rectifier bridge 6 and which is formed of positive half waves is divided by the voltage divider 73-74 and the voltage thus divided is applied to the high impedance input of amplifier 72. The voltage available at the output of amplifier 72 is again divided by the potentiometric divider formed by resistor 18 and by the conduction resistance of the field effect transistor 19. The resulting voltage at the middle point 46 of the potentiometric divider 18-19 is applied through the impedance matching amplifier 78 and the high gain amplifier 13, connected in cascade, to the control electrode of the power transistor 9 for regulating the main current which flows through this power transistor and the measuring resistor 14. The voltage at point 68, which is respresentative of the amplitude of the main current, is filtered by resistor 66 and by capacitor 67 and is applied to the positive input of the comparator amplifier 65 which receives at its negative input the linearly increasing DC voltage which is generated by the Miller integrator 61. The output voltage of the comparator amplifier 65, filtered by resistor 69 and by capacitor 70 is applied to the gate of the field effect transistor 19 so as to modify the conduction resistance thereof in a direction which results in modifying the rectified AC voltage applied to amplifiers 78, 13 and 9 which control the level of the main current, so as to cause the latter to be adjusted to the current defined by the DC voltage ramp produced by the Miller integrator 61. In other words, the DC voltage from the comparator amplifier makes the amplitude of the main rectified AC current which flows through the power transistor 9 and the measuring resistor 14, and so also the amplitude of the main AC current on the AC side of the rectifier bridge, dependent on the amplitude of the DC voltage ramp generated by the Miller integrator 61. The dependence thus provided is a closed loop dependence. Thus, a development of amplitude of the main AC current is obtained which is linear and independent of the voltage of the network and of the possible non linearity of the response of the field effect transistor 19.

The voltage taken at point 68, i.e. at the terminals of the measuring resistor 14, is representative of the amplitude of the main AC current. This voltage is applied through the junction bc of the analog switch 83 and through resistor 84 to the storage capacitor 37. The high input impedance amplifier 39 supplies to the galvanometer 41 a current proportional to the voltage at the terminals of capacitor 37.

If the circuit-breaker 1 operates correctly, when the level of the main AC current reaches the current breaking threshold, the breaking device 5 opens its contacts, so that the AC voltage applied to the rectifier bridge 6 is cut off. This causes transistor 91 to be disabled and transistor 92 becomes saturated. Consequently, the voltage applied to the control terminals d of the analog switches 83 and 95 becomes practically zero. The junction bc of the analog switch 83 therefore opens and the storage capacitor 37 stores the voltage level acquired at the time of breaking, thus allowing the galvanometer 41 to maintain the indication of the value of the tripping current of the circuit-breaker 1.

At the same time, the junction bc of the analog switch 95 opens, whereas its junction ab closes, which results in applying, through the junction ab of the analog switch 97, a negative voltage (the −0.6 V at the terminals of diode 104) to the negative input of the amplifier 96. There appears then at the output of amplifier 96 a positive voltage which is applied through the diode 98 to the control terminals d of the analog switches 63 and 71 and through the resistor 100 to the control terminal d of the analog switch 97. Consequently, the junctions ab of these three analog switches are disabled, whereas their junctions bc are enabled. Because junction bc of analog switch 63 is now enabled, capacitor 21 is discharged through this junction and resistor 62.

In the case where, for any reason whatsoever, circuit breaker 1 does not break, the increase of the amplitude of the main DC current is interrupted when the voltage applied to the positive input of amplifier 96 (this voltage taken at the terminals of the measuring resistor 14 is proportional to the amplitude of the main AC current) exceeds the positive voltage applied to the negative input of the amplifier 96, this latter voltage being defined by the voltage divider 57-58 from the voltage of the reference supplied by the Zener diode 53. The output voltage of amplifier 96 then becomes positive and causes, as before, switching of the analog switches 63, 71 and 97.

Thus, by imposing very precise values on the initial value and on the final value of the DC voltage ramp generated by the Miller integrator 61, which values are defined respectively by the voltage dividers 55-56 and 57-58 from the reference voltage taken at the terminals of the Zener diode 53, because of the comparator amplifier 65 and the slaving amplifiers 78, 13 and 9, values which are also very precise are imposed on the initial value and on the final value of the amplitude of the main AC current. The ohmic values of resistors 55-56 and 57-58 forming the two voltage dividers are chosen so that the initial and final values of the DC voltage ramp and consequently the initial and final values of the AC current ramp define a current range in which is located the nominal non operating value and the nominal operating value of the circuit-breaker. Of course, the AC current ramp generating device of the present invention may comprise several measuring resistors such as resistor 14, whose values would be adapted to the different ratings and selectable by means of a selector switch.

An excessive external impedance, more especially in the grounding circuit of the neutral line fork, may nevertheless prevent the main AC current from reaching the maximum level which has been assigned to it. Circuit 106 allows, on the one hand, such an abnormality to be signalled to the user and, on the other hand, the DC voltage ramp and consequently the AC current ramp to be brought back to its initial value. In fact, the negative input of the comparator amplifier 107 has a potential which is defined, from the voltage taken at the terminals of the two Zener diodes 50 and 53, by the voltage divider 111-112. As long as the DC voltage from the Miller integrator increases normally, the potential applied to the positive input of the comparator amplifier 107 remains smaller than the potential applied to its negative input. Therefore, the output voltage of the comparator amplifier 107 is negative and no current flows through diodes 115 and 117. This condition is maintained until the DC voltage of the ramp reaches the upper limit or final value defined by the voltage divider 57-58. If, at this time, the circuit-breaker 1 has not tripped out and if the output voltage from amplifier 96 has not become positive, it is because the main AC current has not been able to be suitably slaved because of existence of an excessive external impedance. In this case, the DC voltage generated by the Miller integrator 61 continues to increase until the potential applied to the positive input of the comparator amplifier 107 becomes higher than the potential applied to its negative input. The output voltage of the comparator amplifier 107 then becomes positive and this positive voltage, applied through diode 115 to the control terminal d of the analog switch 97, causes this latter to switch, and, consequently, also the analog switches 63 and 71 to switch, which results in bringing the DC voltage reduced by the Miller integrator 61 back to its initial value. Furthermore, a current now flows through the light emitting diode 117 which is then illuminated and thus signals the abnormality to the user.

The temperature responsive element 114, which is placed on the heat sink of the power transistor 9, in combination with circuit 106, protects the power transistor against an excessive rise of its temperature. In fact, the potential difference at the terminals of element 114 is an increasing linear function of its temperature. It follows that, when the temperature of the power transistor 9 and, consequently, that of the element 114 increases, the potential applied to the negative input of the comparator amplifier 107 decreases. Accordingly, the positive voltage which is delivered by the Miller integrator 61 and which is applied, after shifting by the Zener diode 109, to the positive input of the comparator amplifier 107, reaches sooner the potential applied to the negative input of this comparator amplifier. The output voltage of the comparator amplifier 107 thus becomes positive sooner and causes, as before, analog switch 97 to switch and, consequently, also analog switches 63 and 71. The DC voltage ramp generated by the Miller integrator 61 and, consequently, the AC current ramp, are thus brought back sooner to their initial values. In other words, lowering of the maximum potential reached by the DC voltage ramp and so of the maximum level reached by the main AC current is caused when the temperature of the power transistor 9 increases excessively, thus ensuring the protection of this transistor.

Of course, the embodiment of the present invention which has been described above has been given by way of example purely by way of indication ane in no wise limiting, and numerous modifications may be made by a man skilled in the art without for all that departing from the scope and spirit of the invention. Thus, more especially, the Zener diodes 50 and 53 may be omitted if an auxiliary battery is used whose output voltage remains constant for the life span of the battery, for example a mercury oxide battery.

What is claimed is:

1. A device for generating an AC current ramp for checking the tripping current of a circuit-breaker connected to an AC voltage network, comprising a bridge rectifier having first and second pairs of terminals, said first pair of terminals being connectible respectively to an active terminal of the AC voltage network situated downstream of the circuit-breaker and to a neutral wire of said network, a load circuit connected to said second pair of terminals of the bridge rectifier, said load circuit being formed mainly by a power transistor in series with a measuring resistor, a high gain amplifier having an output connected to a control electrode of said power transistor and a first input which receives at least a part of a voltage appearing at the terminals of the measuring resistor, an auxiliary battery, a capacitor charged from said auxiliary battery, a field effect transistor driven by a voltage dependent on a voltage at the terminals of said capacitor, said field effect transistor having a conduction resistance forming with a resistor a potentiometric divider whose middle point is connected to a second input of the high gain amplifier, the potentiometric divider being connected to said second pair of terminals of the bridge rectifier, said device further comprising a constant current generator which is fed with current by the auxiliary battery for charging said capacitor, and a comparator amplifier having a first input which is connected to the capacitor, a second input which is connected to a junction point between the measuring resistor and the power transistor, and an output which is connected to the gate of said field effect transistor.

2. The device as claimed in claim 1, wherein the second input of said comparator amplifier is connected to said junction point through a filter.

3. The device as claimed in claim 1 or 2, wherein said constant current generator and said capacitor form a Miller integrator.

4. The device as claimed in claim 1, wherein said auxiliary battery is a mercury oxide battery.

5. The device as claimed in claim 3, further comprising a first Zener diode connected to the terminals of said auxiliary battery, and a first voltage divider connected to the terminals of said first Zener diode for applying as input voltage to the Miller integrator a voltage defining a minimum initial value of a DC voltage ramp generated by the Miller integrator.

6. The device as claimed in claim 5, further comprising a first analog switch having a first junction connected in series between the output of the Miller integrator and the first input of said comparator amplifier and a second junction connected in series with a resistor to the terminals of said capacitor, a second voltage divider which is connected to the terminals of said first Zener diode and at the middle point of which a voltage is available defining a maximum final value of the DC voltage ramp generated by said Miller integrator, a second amplifier having a first input connected to the junction point between said power transistor and said measuring resistor, a second analog swtich having a first junction which is connected in series between the middle point of said second voltage divider and a second input of said second amplifier and having a second junction which is connected to the negative pole of said auxiliary battery through a resistor and to the anode of said first Zener diode through a first diode, said second amplifier having its output connected through a second diode to control terminals of the first and second analog switches.

7. The device as claimed in claim 6, further comprising a fault indicating circuit comprising a third voltage divider connected to the terminals of said first Zener diode, a third comparator amplifier having a first input which is connected through a second Zener diode to the output of said Miller integrator and a second input which is connected to the middle point of said third voltage divider, and a light emitting diode which is connected to the output of said third comparator amplifier and which is illuminated when the potential applied to the first input of said third comparator amplifier becomes greater than the potential applied to the second input of said third comparator amplifier.

8. The device as claimed in claim 7, wherein the output of said third comparator amplifier is connected through a third diode to the control terminal of said second analog switch.

9. The device as claimed in claim 7, wherein a temperature responsive element is placed in thermal relation with said power transistor and is connected electrically to the terminals of said third voltage divider.

* * * * *